Jan. 31, 1928.
A. J. HEINSIUS
1,657,623
CONTROL DEVICE FOR MOTOR VEHICLES
Filed April 17, 1926
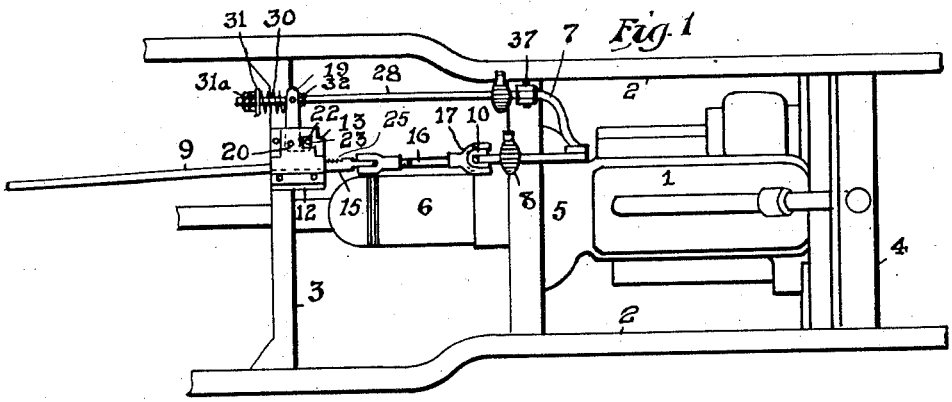
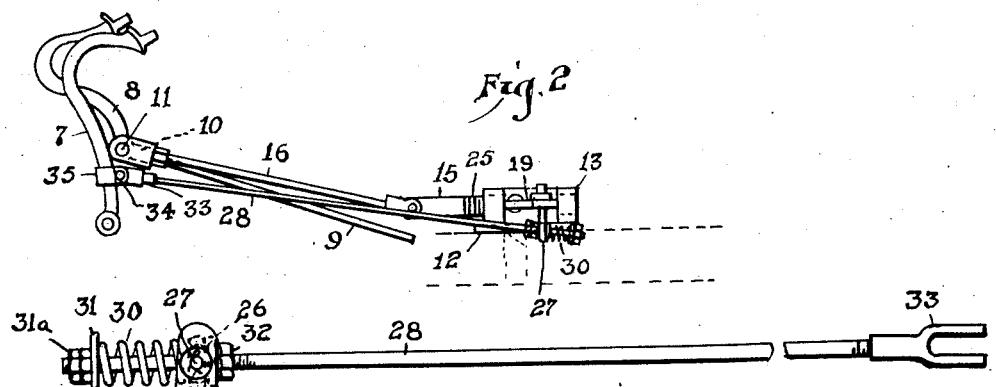
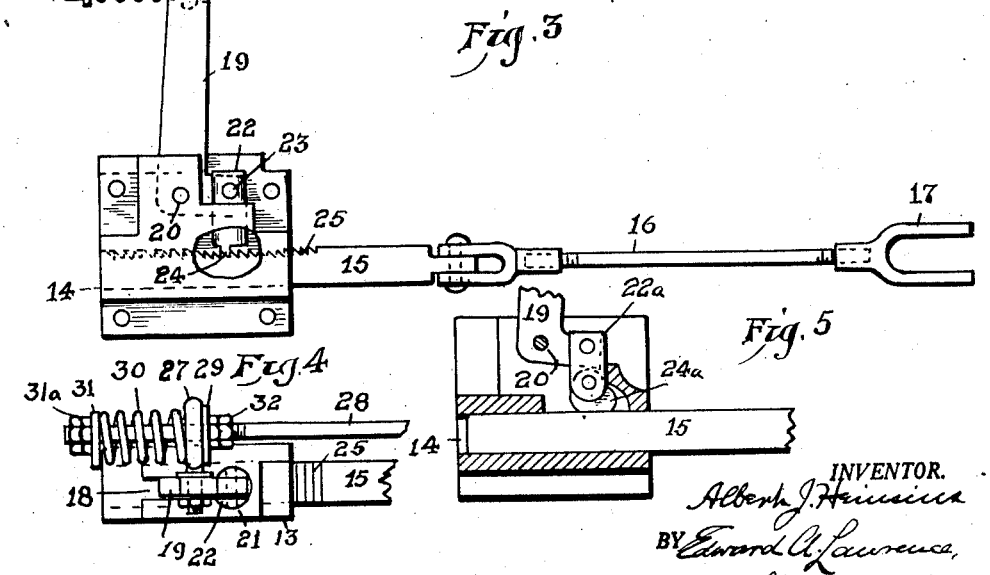
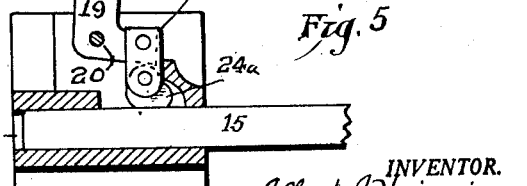
INVENTOR.
Albert J. Heinsius
BY Edward A. Laurence,
his ATTORNEY.

Patented Jan. 31, 1928.

1,657,623

UNITED STATES PATENT OFFICE.

ALBERT J. HEINSIUS, OF PITTSBURGH, PENNSYLVANIA.

CONTROL DEVICE FOR MOTOR VEHICLES.

Application filed April 17, 1926. Serial No. 102,660.

In motor-propelled vehicles a clutch is interposed between the engine and the shift gears and driving shaft so that by disengaging the clutch the vehicle may be stopped or the gears shifted without shutting off the engine.

The practice in stopping is to disengage the clutch by pressing down on the clutch pedal and applying the foot brake, thereby relieving the driving shaft from the propulsive force and halting the forward travel of the vehicle.

When the car is stopped on an ascending grade, the brake must be kept on until the clutch is again engaged, and this is also true when gears are shifted while the car is ascending a grade.

When the car is on an ascending grade and the clutch is to be reengaged the brake must be released as the clutch is engaged, thus employing both feet of the operator and requiring him to use the hand-lever to accelerate the engine. Usually the car is moving backwardly as the clutch becomes engaged, owing to the difficulty of properly synchronizing the operation of the foot brake with the engagement of the clutch, and thus an undue strain is imposed on the driving shaft and the ring-gear of the differential and the car starts forward with a jerk.

It thus requires considerable skill under present conditions to start a motor vehicle on an ascending grade, or to successfully shift gears on an ascending grade where the vehicle is traveling at relatively slow speed, and the danger of accident is always present.

The object which I have in view is the provision of practical means for facilitating the starting of a motor vehicle on an ascending grade or the shifting of gears while the vehicle is ascending a grade.

For this purpose I provide means whereby when the clutch is disengaged and the brake applied, the brake will be automatically held applied until the clutch is again engaged, the reengagement of the clutch automatically releasing the brake, thus making possible the starting of the car or changing of the gears without permitting the car to move rearwardly.

In the preferred embodiment of my invention I provide connections between the clutch pedal mechanism and the brake pedal mechanism whereby when the clutch is disengaged and the foot brake is applied, the brake is locked set and is automatically released when the clutch is reengaged.

Other novel features of construction, and also of arrangement of parts will appear from the following description.

In the accompanying drawings, wherein I have illustrated the best embodiment of the principles of my invention now known to me, Fig. 1 is a plan view of the fore part of the chassis of a motor vehicle with my invention applied thereto; Fig. 2 is a side elevation showing the clutch pedal lever and the foot pedal lever and the locking device; Fig. 3 is an enlarged plan view of the locking device and the links which connect the two pedal levers thereto; Fig. 4 is a side elevation of the locking device, and Fig. 5 is a broken plan view partially in horizontal section of a modified form of the locking device.

Referring first to Figs. 1 to 4, inclusive, 1 represents the engine of the motor vehicle mounted on the chassis frame of which the side bars 2 and the cross-bar 3 are shown. 4 represents the radiator, 5 the clutch casing and 6 the shift-gear box.

7 represents the usual clutch-pedal lever which is depressed by the left foot of the operator to disengage the clutch, the clutch being of course spring-returned into engagement when the foot pressure is relieved.

8 represents the usual pedal lever for the service brakes which in some vehicles are applied to the driving shaft but are more commonly applied to the brake-drums of the driving wheels of the vehicle. Thus I show the lever of the pedal 8 connected to the brake rod 9 which is shown extending rearwardly toward the rear wheels of the vehicle. The usual connection is shown, the front end of the rod 9 being provided with a yoke 10 which straddles the pedal lever, a pivot pin 11 being inserted through alined holes in the lever and in the arms of the yoke.

The foregoing construction is standard in the majority of present day motor vehicles.

12 represents a horizontally disposed bracket secured by bolting on the cross-brace 3 of the chassis frame and on said bracket is bolted the chambered block or casting 13. The block 13 is provided with a longitudinal bore or slideway 14 of rectangular cross-sectional shape, and in which is slidably mounted a bar 15 whose front end is pivotally connected to the rear end of a link 16. The front end of the link is provided with a yoke 17 of sufficient internal clearance to straddle the yoke 10 of the brake rod 9, the pin 11 also extending through holes in the arm of the yoke 17, thereby pivotally connecting the front end of the link 16 to the brake pedal lever 8.

It is evident that when the pedal lever 8 is pushed down to apply the brakes, the bar 15 will be drawn forwardly in the slideway 14, and unless locked, as will be later explained will be moved rearwardly in the slideway when the foot pressure is relieved from the brake pedal.

The block 13 is also provided with a horizontally disposed recess 18 in one side in which the apex and shorter arm of a bell-crank lever 19 works, the lever 19 being pivoted at its axis on the pin 20 which extends through the upper and lower walls of the recess. 21 is a cylindrical bore extending horizontally through the material of the block 13 communicating at its inner end with the slideway 14. 22 is a dog slidable in the bore 21 and having its outer end bifurcated to receive the short arm of the bell-crank lever 19 to which it is connected by the pivot pin 23.

The inner end of the dog 22 is provided with one or more teeth 24 which are adapted to engage with the teeth 25 formed on the adjacent face of the bar 15, the shoulders of the teeth 25 being faced toward the rear of the chassis while that of the tooth 24 is faced toward the front, thus enabling the dog, when resiliently pressed inwardly, to positively lock the bar against its rearward movement but permitting forward movement of the bar.

The longer arm of the bell-crank lever 19 is provided with a hole 26 through which extends the stem of the eye-bolt 27, the stem being held in said hole by a washer and cotter pin, as shown in Fig. 4. The eye of the bolt 27 is slipped on the rear end of a cylindrical link 28 and is held against the stationary front washer 29 by the helical spring 30 coiled about the link 28 and having its rear end bearing against the end washer 31 held on the link by the nuts 31ᵃ which are employed to adjust the power of the spring. The front washer 29 is held against forward movement by the nuts 32 screwed on a threaded portion of the link.

The front end of the link 28 is provided with a yoke 33 which is pivotally connected as by the pivot pin or bolt 34 with a split collar 35 clamped to the clutch pedal lever 7.

The operation of the device is as follows.

When the vehicle is to be stopped or the gears shifted, the clutch pedal lever 7 and the brake pedal lever 8 are both pressed down, the clutch being thus disengaged and the service brakes applied. As is evident the said movement of the pedal lever 8 will draw the bar 15 forwardly in the guideway 14, the teeth 25 trailing forwardly past the dog 22. Simultaneously the mentioned movement of the pedal lever 7 will through the resilient influence of the spring 30 rock the long arm of the bell-crank lever 19 forwardly, thus swinging its short arm so as to force the toothed dog 22 into engagement with the teeth of the bar 15.

The foot pressure on the brake pedal lever 8 may then be relieved but the dog 22 will hold the bar 15 stationary in its guideway as long as the clutch is disengaged, thus holding the service brakes applied until the pressure on the clutch pedal lever 7 is relieved and the clutch moves into engagement. The upward movement of the pedal lever 7 when the foot pressure is relieved therefrom causes the bell-crank lever 19 to return to its idle position, thus disengaging the dog 22 from the bar 15 and permitting the foot brake spring to automatically release the brakes. As the dog 22 is out of locking engagement with the bar 15 except when the clutch is disengaged, there is no interference with the use of the service brakes while the clutch is engaged.

It is evident that the disengagement of the clutch before the application of the service brakes will not interfere with the subsequent application of the service brakes as the teeth of the bar 15 will trail forwardly past the spring depressed dog but when once applied the service brakes will be locked set until the clutch is again permitted to return to engagement.

In Fig. 5 I show a modified form of dog 22ᵃ whose inner end is provided with a pivotally attached arcuate cam shoe 24ᵃ as a substitute for the tooth 24 shown in the other figures of the drawings. Said shoe is eccentrically connected to the dog so that it may prevent rearward movement of the bar 15 when the clutch is disengaged but will not prevent forward movement of the bar 15, thus permitting the brake to be applied after the clutch has been disengaged. After their application the service brakes will be held applied until the clutch is permitted to return to engagement.

It is evident from the foregoing that the stopping and starting of a motor vehicle on an ascending grade and the shifting of its gears on an ascending grade may be accomplished without danger of rearward moving of the vehicle and without jerking or imposing a strain on the differential or transmission.

The device is simple and inexpensive y durable and efficient. It may be applied small expense to any motor vehicle provided with a clutch and brakes.

When it is desired to coast with the clutch disengaged, the clutch is thrown out and if desired the service brake is partially applied to the degree necessary to maintain the desired speed. The service brakes are automatically locked in their adjusted position, but may be applied to a greater degree at any time by simply pushing in the brake pedal to the proper extent. If it is desired to release the brakes, all that is necessary is to permit the clutch to momentarily reengage.

What I desire to claim is:—

1. In combination with the clutch mechanism and the brake mechanism of a motor vehicle, connections for automatically holding the brakes applied while the clutch is disengaged.

2. In combination with the clutch mechanism and the brake mechanism of a motor vehicle, a locking device actuated by the disengagement of the clutch for holding the brakes applied while the clutch is disengaged.

3. In combination with the clutch mechanism and the brake mechanism of a motor vehicle, means whereby when the clutch is disengaged and the brakes applied the brakes are locked against release until the clutch again moves in to engagement.

4. In combination with the clutch mechanism and the brake mechanism of a motor vehicle, an element moving with the brake setting mechanism and a locking device actuated by the disengagement of the clutch and engaging said element to prevent the release of the brakes until the return of the clutch to engagement.

5. In combination with the clutch mechanism and the brake mechanism of a motor vehicle, a toothed bar moving with the brake setting mechanism, a locking dog arranged to engage said bar and lock the same stationary to prevent the release of the brakes, and means whereby the engagement of the clutch causes the disengagement of said dog.

6. In combination with the clutch mechanism and the brake mechanism of a motor vehicle, a toothed bar moving with the brake setting mechanism, a locking dog arranged for engagement with said bar and locking the brakes against release, and connections between said dog and the clutch mechanism whereby when the clutch is disengaged said dog is operative and when the clutch is engaged said dog is rendered inoperative.

7. In combination with the clutch mechanism and the brake mechanism of a motor vehicle, means whereby when the service brake is applied the disengagement of the clutch locks said brake against release and means whereby the reengagement of the clutch releases said locking means.

8. In combination with the clutch mechanism and the brake mechanism of a motor vehicle, means for locking the brake in its applied position, and connections whereby when the clutch is disengaged said locking means are operated and when the clutch is reengaged said locking means are released.

Signed at Pittsburgh, Pa., this 13th day of April, 1926.

ALBERT J. HEINSIUS.